No. 11,706. Reissued Jan. 3, 1899.

E. W. G. C. HOFFMANN.

ELECTRIC BUOY.

(Application filed Dec. 8, 1898.)

2 Sheets—Sheet 1.

Witnesses.
L. M. C. Dannet.
A. D. Lawrence.

Inventor.
Ernst W. G. C. Hoffmann
By Parker & Brown
Attorneys.

THE NORRIS PETERS CO., WASHINGTON, D. C.

No. 11,706. Reissued Jan. 3, 1899.

E. W. G. C. HOFFMANN.

ELECTRIC BUOY.

(Application filed Dec. 8, 1898.)

2 Sheets—Sheet 2.

Witnesses.

D. M. C. Bennet.

A. D. Lawrence.

Inventor.

Ernst W. G. C. Hoffmann

By Parton & Brown

Attorneys

THE NORRIS PETERS CO., WASHINGTON, D. C.

UNITED STATES PATENT OFFICE.

ERNST WILHELM GUSTAV CARL HOFFMANN, OF CHARLOTTENBURG, GERMANY, ASSIGNOR TO THE SIEMENS & HALSKE ELECTRIC COMPANY OF AMERICA, OF CHICAGO, ILLINOIS.

ELECTRIC BUOY.

SPECIFICATION forming part of Reissued Letters Patent No. 11,706, dated January 3, 1899.

Original No. 607,745, dated July 19, 1898. Application for reissue filed December 8, 1898. Serial No. 690,360.

*To all whom it may concern:*

Be it known that I, ERNST WILHELM GUSTAV CARL HOFFMANN, a subject of the Emperor of Germany, residing at Charlottenburg, Germany, have invented new and useful Improvements in Electric Buoys, (Case No. 86,) of which the following is a specification.

My invention relates to improved means for operating marine appliances.

The object of my said invention is to provide means for controlling from a distance such appliances as buoys, mines, &c., which it is desirable to float or submerge at will.

I will describe my invention as applied to a buoy adapted for signaling purposes. It often becomes desirable in the employment of such buoys anchored as signals in navigable waters or harbors to sink or float them, and this of course is most readily accomplished by means controlled from some central station or observatory conveniently situated and usually upon the shore or mainland.

The device of the present application consists of a hollow cylindrical buoy, within which are provided a pump and electric motor, whereby water is pumped in and out of the said buoy, thereby sinking or floating the same. A cable containing insulated conducting-wires connected with a source of current serves to anchor the buoy in position and supply current to the motor and also to a number of incandescent lamps mounted in a lantern at the top of the buoy.

I will describe my invention more particularly by reference to the accompanying drawings, in which—

Figure 1:
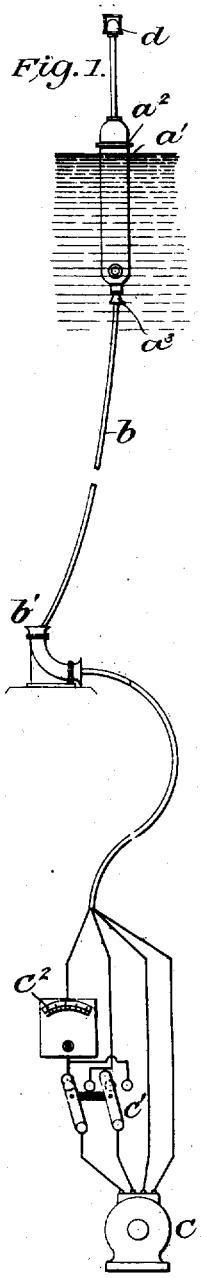
Figure 2:
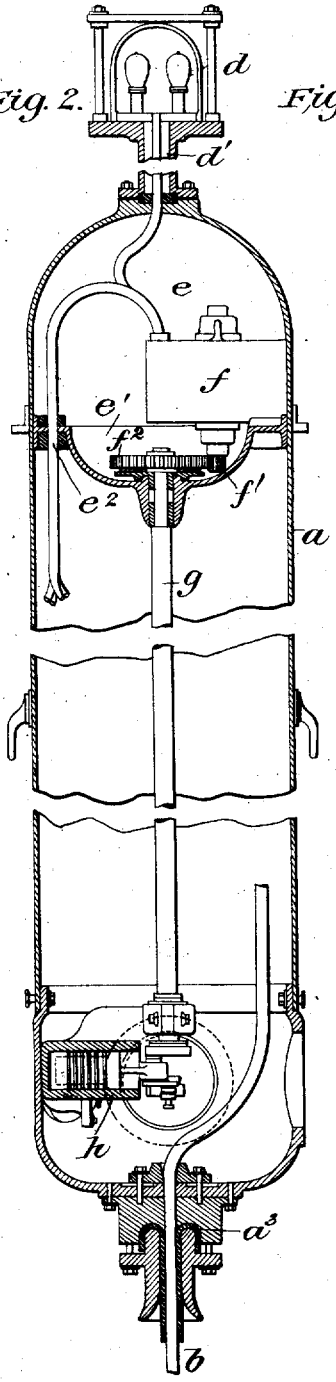
Figure 3:
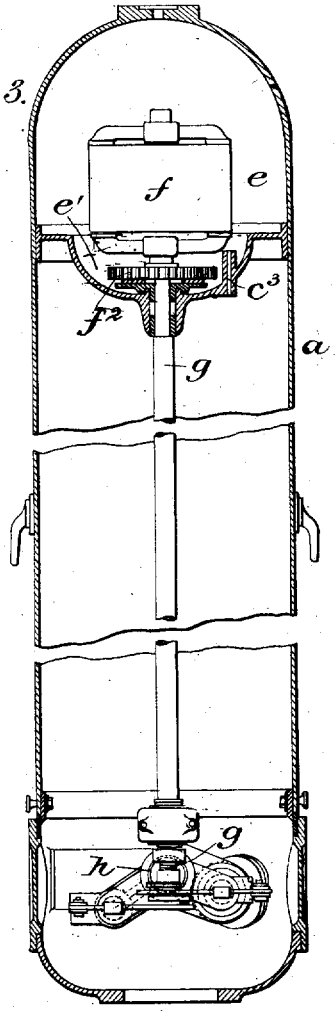
Figure 4:
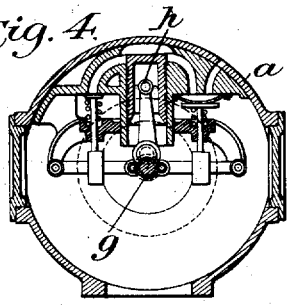
Figure 4:
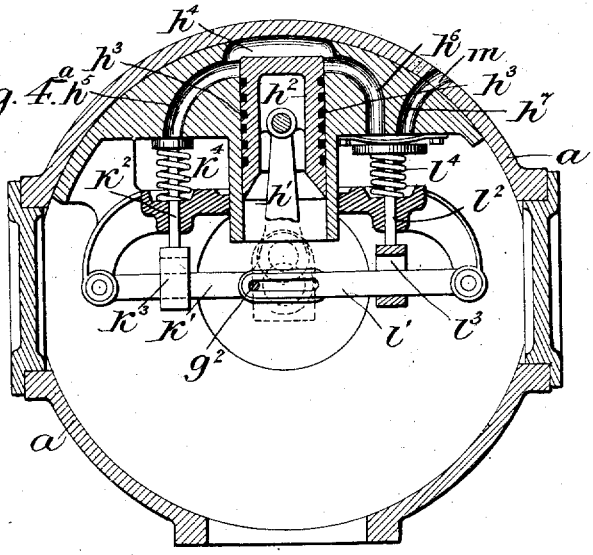
Figure 5:
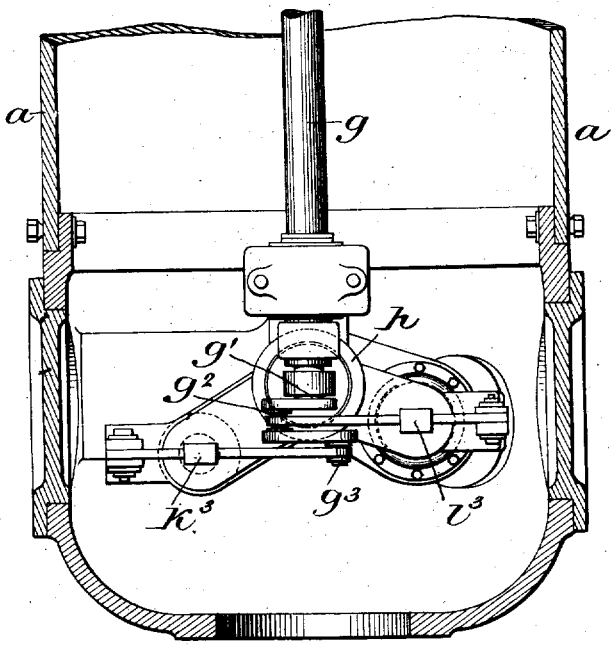

Figure 1 shows the buoy floating at anchor and the shore connections in diagram. Fig. 2 is a vertical sectional view of the buoy and lantern. Fig. 3 is another sectional view of the buoy at right angles to the view shown in Fig. 2. Fig. 4 is a transverse sectional view. Fig. $4^a$ is a similar view upon an enlarged scale, illustrating the pump and its operating connections; and Fig. 5 is a vertical sectional view through the lower portion of the buoy, also showing these parts.

Like parts are denoted by the same letters throughout the several figures of the drawings.

The hollow cylindrical casing $a$, of iron or steel, is made air and water tight excepting for the pump-valve opening, and when normally filled with air remains afloat, so that $a'$ marks the water-line. The weight of the buoy and apparatus is such, however, that should the pump-valves leak and water enter until the pressure within and without the buoy is equal the buoy will sink only until the water-line is marked by $a^2$. Hence the buoy will always remain afloat, even though the apparatus or valves should fail to operate properly.

An insulated cable $b$, containing conducting-wires, anchors the buoy in position and connects the same with a source of electrical current $c$, a pole-changing switch $c'$, and an ampere-meter $c^2$, conveniently situated for the operation of the buoy. The anchor $b'$ and the stuffing-box $a^3$, through which the cable enters the buoy, are provided with flaring or funnel-shaped openings, so as to permit the free movement of the buoy and prevent injury thereby to the cable.

Upon the upper end of the buoy is mounted a shaft $d'$, carrying the lantern $d$, which is hermetically sealed and contains a number of incandescent lamps electrically connected with the cable, which may be made to serve the double purpose of furnishing a signal at night and acting as indicator of the proper operation of the mechanism contained within the buoy.

Within the closed chamber $e$, provided by placing a partition $e'$ across the upper end of the buoy, is situated the motor $f$, connected with the cable by insulated wires entering through the stuffing-box $e^2$. A multiphase type of motor is preferably employed, because it may be reversed at pleasure by means of the switch $c'$ at the operating-station and also starts at once under a load. Furthermore, this type of motor obviates the use of brushes and commutators, thus lessening the need of attention and repair. My said invention is not, however, limited to any particular class of motor. The cup-shaped portion of the partition $e'$ is filled with oil, which serves both to lubricate the bearings and hermetically seal the chamber, excepting when the equalizing air-valve $c^3$ operates, which serves to prevent the oil from being forced into the lower chamber by the air-pressure in the chamber $e$, should the air in the former become rarefied. The air in chamber $e$ is maintained in a dry condition by the employment of any of the well-known means for accomplishing such result.

The pinion $f'$, mounted upon the armature-shaft of the motor, meshes with a gear-wheel $f^2$, keyed upon the shaft $g$, which is mounted to rotate in the axis of the buoy. Upon the lower end of said shaft are provided the triple cranks $g'$ $g^2$ $g^3$, respectively connected by pitman $h'$ with piston $h^2$ of the pump $h$ and actuating-levers $k'$ $l'$ of the pump-valve appliances $k$ $l$. The piston $h^2$ is hollow or cup-shaped and has packing-rings $h^3$ encircling the same.

The water-chamber $h^4$ and passages $h^5$ $h^6$ $h^7$ are made relatively of large size, producing in the pump considerable clearance, the purpose of which will more fully appear.

The levers $k'$ $l'$ are pivotally mounted at their outer ends, while their inner ends are slotted to receive the wrist-pins of cranks $g^2$ $g^3$. Upon the valve-rods $k^2$ $l^2$ are provided the slotted heads $k^3$ $l^3$, which respectively receive the actuating-levers $k'$ $l'$ and admit of a limited movement of the said levers within the slots.

The valve-springs $k^4$ $l^4$ are adapted to maintain the valves closed except when the said valves are actuated by means of their respective valve-rods and actuating-levers. These are actuated by said levers and cranks alternately to open and close, their relative succession depending upon the direction of rotation of the motor $f$ and shaft $g$. For example, the rotation of the shaft and its connected triple cranks in a contra-clockwise direction will serve, first, to withdraw the piston from the position shown and open valve $l$, whereby water is drawn through the port $m$ into the water-chamber and pump-cylinder during the outward stroke of the piston, and upon the continued rotation of said parts valve $l$ will close, while valve $k$ will be opened, and the return of the piston will force the water into the lower chamber of the buoy. Upon the rotation of the shaft in an opposite direction a reversal of the above action will occur and water will be pumped out of the buoy. A single-acting pump, preferably, is employed, which is provided with valves positively actuated by cranks or eccentrics mounted upon the actuating-shaft.

My invention, however, does not contemplate alone the use of a pump of the type and with the characteristics herein shown and described. The operation of the pump upon the rotation of the shaft $g$ in one direction serves to force water into the lower chamber of the buoy, while the rotation of the shaft in the opposite direction effects the expulsion of the water therefrom, thus sinking or floating the buoy, as desired. The movements of said buoy are accordingly readily controllable from the operating-station.

Should a pump of the usual construction be employed, the continued action of the said pump after the water in the buoy has been expelled would result in the rarefaction of the air in the lower chamber, and upon stopping the pump the buoy would be sunk by reason of the entrance of water through the pump-valves to fill the partial vacuum thus produced, it being impracticable to make the said valves absolutely tight. Such a contingency is, however, provided for by the comparatively great clearance allowed in the pump between the piston and the valves, thereby preventing the rarefaction of the air in the lower chamber to any great extent, while not affecting the capacity or operation of the pump as long as water is passing through it. By employing a single-acting pump considerable fluctuation in the torque of the motor must result when the device is in operation, which may be readily indicated at the operating-station by cutting an ampere-meter in circuit. By this means it may be immediately determined whether the pump is acting or not.

Although I have described my invention in but one of its applications, I do not wish to be understood as limiting the same to an improvement applicable merely to buoys, as it is evident that my invention is quite applicable to any device which requires to be submerged at various depths or floated, as desired, such as mines, torpedoes, and other marine appliances. Neither do I desire to limit my invention to the precise construction shown herewith, as different arrangements of the elements can be made without departing from the spirit of my invention—as, for example, the motor and pump might be placed in a single chamber and the air be exhausted from another chamber and compressed in the first, thereby permitting the entrance of water and the submergence of the buoy.

Having thus described my invention, what I claim as new, and desire to secure by Letters Patent, is—

1. In a device of the class described adapted to be floated and submerged, the combination with a pump designed to secure the entrance and exit of the water serving as variable ballast in the device, the said pump having a relatively large clearance, whereby the rarefaction of air in the device is avoided, of means for actuating said pump controllable from without the device, substantially as described.

2. In a submersible marine appliance, the combination with a closed water-ballast chamber normally filled with a gas under nominal pressure, of a reversible motor, a pump actuated thereby adapted to effect the entrance to and the expulsion of water from the said chamber, according to the direction of the motor's rotation, and means for driving the motor in either direction, substantially as described.

3. In a device of the class described adapted to be floated and submerged as desired, the combination with pump mechanism *h* adapted to force water into and out of said device, of a reversible motor actuating the said pump, the direction of rotation of said motor being adapted to control the action of the pump, and means for operating the said motor in either direction, whereby the pump is caused to force water out of or into said device and float or submerge the same, substantially as described.

4. The combination in a submersible marine appliance, with a water-ballast chamber, of a pump associated therewith, a reversible electric motor actuating said pump and adapted to effect the entrance of water to or the expulsion of water from said chamber according to the direction of rotation of said motor, and means controllable from without the appliance for effecting the actuation of the motor and pump, substantially as described.

5. In a device of the class described adapted to be floated and submerged, the combination with an electric motor, of a single-acting pump driven thereby, a ballast-chamber adapted to be filled with water and secure the submergence of said device, a source of electrical current, conductors connecting the same with the motor, and an ammeter connected in the circuit, whereby the fluctuations in the torque of the motor are indicated and the proper operation of the device may be determined, substantially as described.

6. In a device of the class described, the combination with a water-ballast chamber, of a pump associated therewith, a reversible electric motor actuating said pump and adapted to effect the entrance of water to or the expulsion of water from said chamber, a source of electric current, and means controllable from a distance for effecting the operation of the motor, substantially as described.

7. In a submersible marine appliance, the combination with a closed water-ballast chamber normally filled with a gas under nominal pressure, of a pump associated with said chamber, a reversible electric motor actuating said pump and adapted to effect the entrance of water to or the expulsion of water from said chamber according to the direction of rotation of said motor, a source of electric current, and means controllable from a distance for effecting the operation of the motor, substantially as described.

8. The combination in an electrically-operated buoy adapted to be submerged or floated as desired, with a closed water-ballast chamber, of a reversible electric motor *f*, a pump *h* actuated by said motor and adapted to effect the entrance of water to or the expulsion of water from said chamber according to the direction of rotation of the motor, the said pump having disproportionally large clearances, and positively-actuated valves, the lantern *d* provided with incandescent lamps, a cable *b*, a source of electric current *c* connected by said cable with the motor and lamps, and means for effecting the actuation and reversal of the motor, substantially as described.

In witness whereof I hereunto subscribe my name this 14th day of November, A. D. 1898.

ERNST WILHELM GUSTAV CARL HOFFMANN.

Witnesses:

PAUL ROEDIGER,

E. L. GOLDSCHMIDT.